United States Patent [19]

Endo

[11] Patent Number: 5,231,515
[45] Date of Patent: Jul. 27, 1993

[54] IMAGE READING DEVICE

[75] Inventor: Makoto Endo, Tokyo, Japan

[73] Assignee: Canon Kabushiki Kaisha, Tokyo, Japan

[21] Appl. No.: 604,955

[22] Filed: Oct. 25, 1990

[30] Foreign Application Priority Data

Nov. 7, 1989 [JP] Japan .................................. 1-288043
Nov. 20, 1989 [JP] Japan .................................. 1-299868

[51] Int. Cl.$^5$ ................................................ H04A 1/40
[52] U.S. Cl. .................................... 358/447; 358/448; 358/487; 358/443
[58] Field of Search ............... 358/443, 445, 447, 448, 358/452, 455, 457, 458, 461, 462, 463, 464, 467, 487; 382/54

[56] References Cited

U.S. PATENT DOCUMENTS 4,658,299  4/1987  Tanaka et al. ..................... 358/448
5,032,903  7/1991  Suzuki et al. ........................ 358/75

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An image reading device makes edge emphasis processing or density conversion processing for an image signal output after reading a film image different according to whether the film image is a negative image or a positive image.

9 Claims, 10 Drawing Sheets

|  | α | SHARP | VR VALUE |
|---|---|---|---|
| POSITIVE FILM (P TABLE) | 0 ~ 1 | 0 ~ 15 | 0 ~ 255 |
| NEGATIVE FILM (N TABLE) | 1 ~ 4 | 16 ~ 63 | 0 ~ 255 |

× α  (α IS COFFICIENT)

IMAGE READING DEVICE

BACKGROUND OF THE INVENTION

1. Field of the Invention

This invention relates to an image reading device for performing digital image signal processing, and more particularly, to an image reading device used in a film scanner or a digital film printer which reads a film original, such as a microfilm or the like, by an image sensor, such as a CCD (charge-coupled device) or the like, and performs digital image signal processing.

2. Description of the Related Art

As reader printers for microfilms, so-called analog-type reader printers have been used in which a microfilm image is irradiated by an illuminating lamp, projected light from the microfilm is enlarged into an arbitrary magnification by a projection lens, the enlarged image is subjected to slit exposure onto a photosensitive member, such as a photosensitive drum or the like, and the image on the photosensitive member is subjected to processes such as toner development, transfer and the like by an electrophotographic method to obtain a copy of the microfilm image. Recently, so-called digital-type reader printers have also been developed in which the above-described projection light is not subjected to slit exposure onto a photosensitive member, but is read by an image sensor, such as a CCD or the like, is then subjected to signal processing such as image processing and the like, and the resultant digital signal is transmitted to a printer, such as an LBP (laser-beam printer) or the like, to obtain a copy of the microfilm image. The assignee of the present application has proposed one of such printers in U.S. Pat. No. 4,700,237.

There are two kinds of microfilms, that is, a negative film and a positive film, which are used properly according to specific purposes. The assignee of the present application has proposed in U.S. Pat. Nos. 4,341,463 and 4,627,703 apparatus incorporating two kinds of image forming processes so that both negative and positive films can be reproduced (as positive copies) in an analog-type reader printer.

In such conventional analog-type reader printers having two kinds, that is, negative and positive, of image forming processes, there are the disadvantages that the circuitry and mechanism become complicated. For example, toners having different polarities are needed, two kinds of developing units must be provided, a mechanism for switching between these developing units must be provided, circuitry or a mechanism must be provided for switching polarity of the high-voltage output of a transfer charger or the like, two kinds of high-voltage power supplies must be provided due to a difference in load characteristics of high-voltage outputs, and blank exposure for providing blank must be switched. However, by setting a high-voltage output value so that an optimum $\gamma$ characteristic (exposure amount vs density characteristic) can be obtained for both negative and positive films, reproduced images having excellent gradation can be obtained for both negative and positive films.

To the contrary, in a digital-type reader printer, since, basically, a positive copy (a positive reproduced image) can be obtained from either a negative film or a positive film by only outputting an inverted digital signal, complicated circuitry and mechanism are not specifically needed as in the case of an analog-type reader printer.

Figure 16:
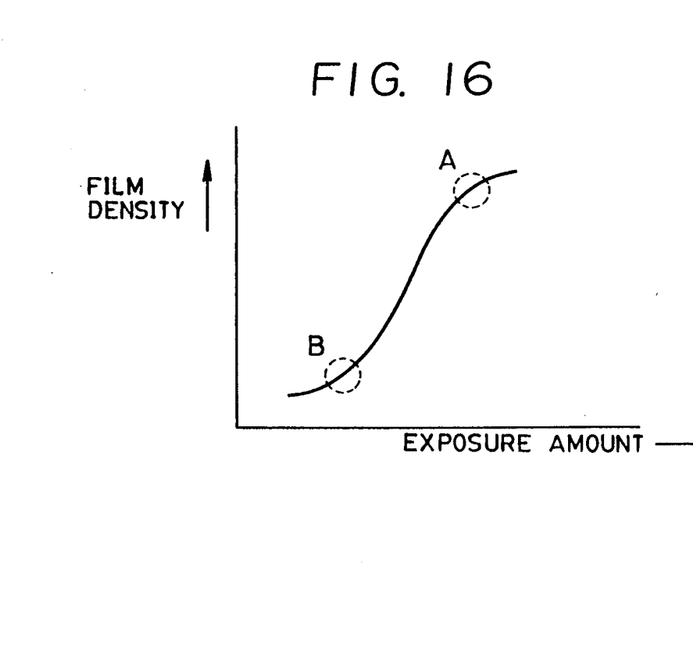
FIG. 16 is a characteristic diagram showing a $\gamma$ characteristic of a film.

However, it is impossible to obtain a reproduced image having excellent gradation by only inverting a digital signal as described above. One of the main reasons is that the $\gamma$ characteristic of a film is not linear, but is nonlinear, and curves near points A and B in the $\gamma$ characteristic curve of a film shown in FIG. 16 are not symmetrical. Accordingly, when a positive original is photographed onto a film, the portion A corresponds to a line-drawing portion, and the portion B corresponds to a background portion. To the contrary, when a negative original is photographed onto a film, the portion B corresponds to a line-drawing portion, and the portion A corresponds to a background portion. Hence, there is the problem that gradation becomes different between a negative film and a positive film.

In general, in the case of a positive film, since dust, stain, scratches and the like on the film have densities close to those of line-drawing portions, they become considerably emphasized if sharpness of the image is too strong, and so a dirty image is obtained. To the contrary, in the case of a negative film, since dust and the like on the film have densities close to those of background portions, they do not become emphasized even if sharpness of the image is increased.

As can be understood from the foregoing description, the degree of sharpness must be changed between a negative film and a positive film. In a conventional digital-type reader printer, however, an output signal from an image sensor, an input signal from a reception device, or the like is inverted in accordance with the kinds of negative/positive films. Hence, although complicated circuitry and a complicated mechanism as required in the case of an analog-type reader printer are not needed, there is the disadvantage that sharpness is so strong for a positive film that dust, stain, scratches and the like on the film are emphasized, and so a dirty image is obtained since edge emphasis processing is not changed in accordance with the kinds of negative/positive films.

SUMMARY OF THE INVENTION

The present invention has been made in consideration of the above-described problems.

It is an object of the present invention to provide an image reading device capable of excellently reading images of both negative and positive films.

It is a further object of the present invention to provide an image reading device which performs edge emphasis processing suited for each image of positive and negative films.

It is a still further object of the present invention to provide an image reading device which prevents dust, stain, scratch and the like on a film from being emphasized, and which can improve picture quality of an output image.

It is still another object of the present invention to provide an image reading device which performs density conversion processing suited for each image of negative and positive films.

In accordance with one aspect of the invention, an image reading device comprises reading means for reading a film image to output an image signal, processing means for performing a process for edge emphasis of the image signal output from the reading means, indication means for indicating whether the film image is a negative image or a positive image, and control means for making the edge emphasis process different for a negative image and a positive image according to the indication by the indication means.

In accordance with another aspect of the invention, the image reading device comprises reading means for reading a film image to output an image signal, processing means for performing a process for density conversion of the image signal output from the reading means, indication means for indicating whether the film image is a negative image or a positive image, and control means for making the density conversion process different for a negative image and a positive image according to the indication by the indication means.

These and other objects and effects of the present invention will become more apparent from the following description made in reference to the accompanying drawings.

DETAILED DESCRIPTION OF THE PREFERRED EMBODIMENTS

Embodiments of the present invention will now be explained in detail by reference to the drawings.

(1) Basic Configurations

Figure 1:
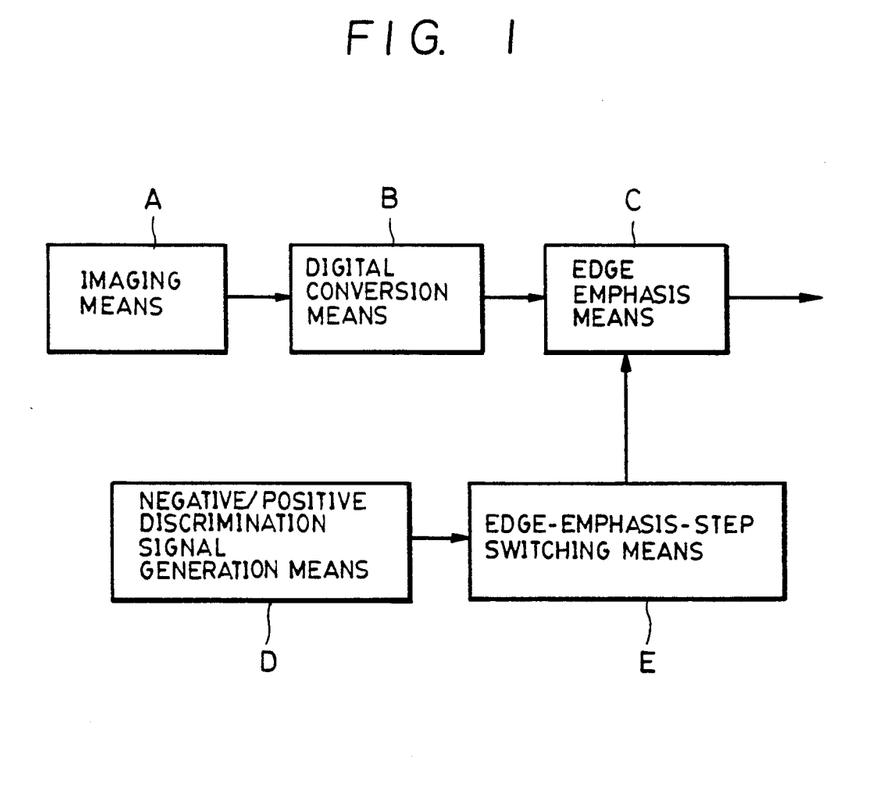
FIGS. 1-3 are block diagrams showing the basic configurations of embodiments of the present invention.

FIG. 1 shows a first basic configurations of the embodiment of the present invention. In FIG. 1, an imaging means A converts an imaged image of an original into an electrical signal. A digital conversion means B amplifies an output analog signal from the imaging means A and converts the amplified signal into a digital signal. An edge emphasis means C emphasizes edge portions in the digital signal output from the digital conversion means B.

A negative/positive discrimination signal generation means D generates a discrimination signal indicating whether the above-described image of the original is a negative image or a positive image. An edge-emphasis-step switching means E, having a plurality of edge-emphasis steps, selects and switches one of the edge-emphasis steps according to the discrimination signal from the negative/positive discrimination signal generation means D and supplies the edge emphasis means C with it.

For example, the edge emphasis means C is a Laplacian space filter, and the edge-emphasis step is a coefficient of a convolution mask for the space filter.

Figure 2:
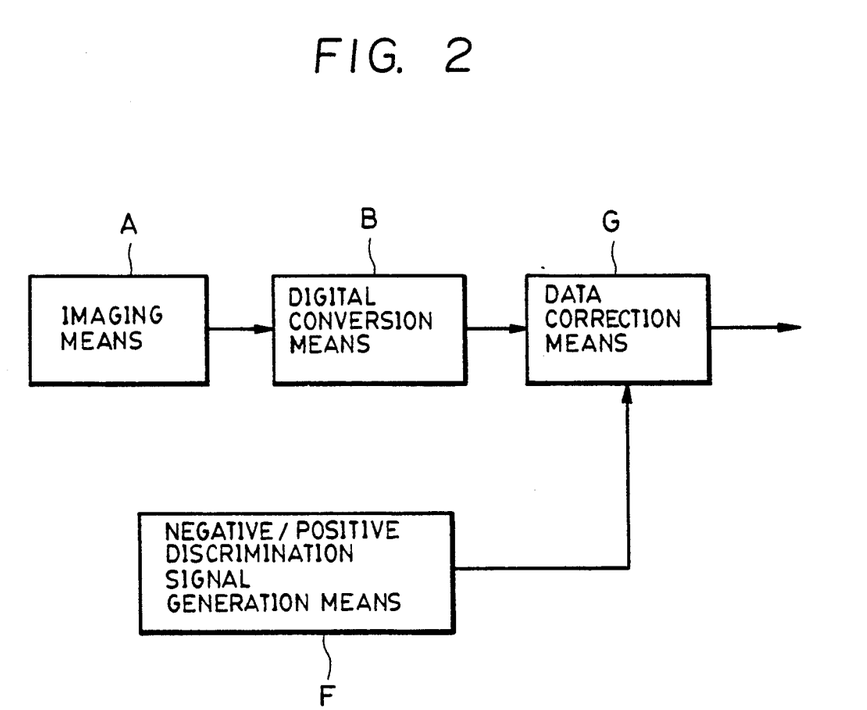

FIG. 2 shows a second basic configuration of the embodiment of the present invention. In FIG. 2, an imaging means A converts an imaged image of an original into an electrical signal. A digital conversion means B amplifies the electrical signal and converts the amplified signal into a digital signal. A discrimination signal generation means F generates a discrimination signal indicating whether the above-described image of the original is a negative image or a positive image. A data correction means G performs data correction of the above-described digital signal according to data of a data correction characteristic selected from a plurality of data correction characteristics in accordance with the discrimination signal.

For example, the data correction means G comprises a memory device previously storing conversion data relative to the plurality of data correction characteristics, and the data correction processing is performed by performing table look-up of the memory device.

Figure 3:
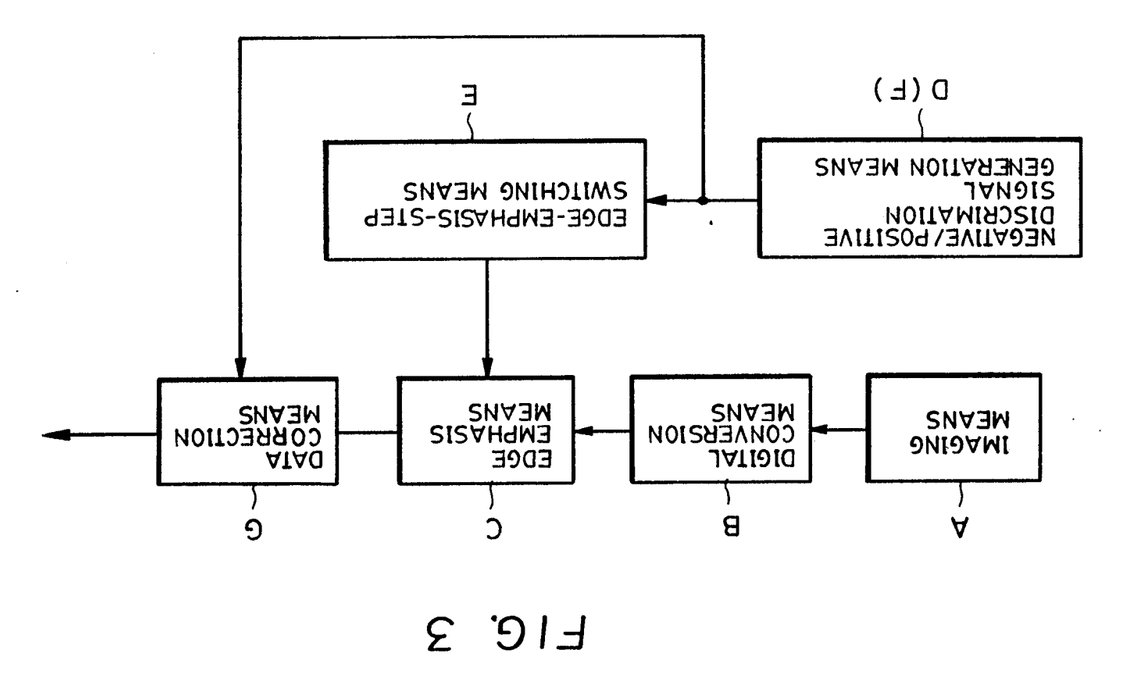

Although, in FIGS. 1 and 2, configurations are shown in which the edge emphasis means C and the data correction means G are separately provided, a configuration may also be adopted in which the edge emphasis means C and the data correction means G are connected in series, as shown in FIG. 3.

(2) First Embodiment

Figure 4:
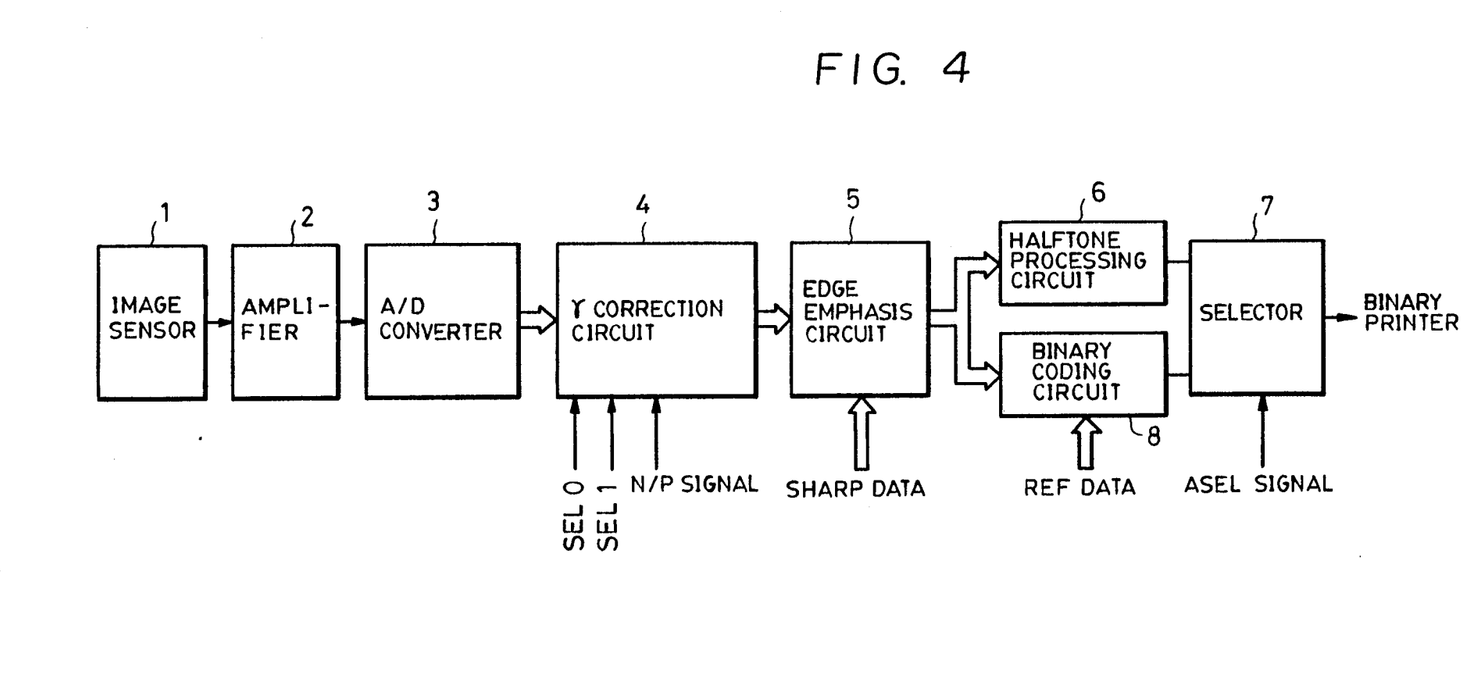
FIG. 4 is a block diagram showing the circuit configuration of an embodiment of the present invention.

FIG. 4 shows an example of the configuration of principal circuitry of a film reader printer in which the present invention is applied to reading of microfilms. In FIG. 4, an image sensor (for example, a CCD line sensor or a contact-type image sensor) 1 reads an enlarged projection image of a microfilm. An amplifier 2 connected to the image sensor 1 amplifies an output signal from the image sensor 1. An A/D (analog-to-digital) converter 3 connected to the amplifier 2 converts an analog signal output from the amplifier 2 into a digital signal. A $\gamma$ correction circuit 4 performs data conversion of input data from the A/D converter 3 according to a conversion characteristic represented by a predetermined curve ($\gamma$ curve). An edge emphasis circuit 5 comprises a digital filter for converting an input signal from the $\gamma$ correction circuit 4 into a signal having an edge-emphasis waveform. A halftone processing circuit (for example, a signal processing circuit using a dither method or an error diffusion method) 6 performs pseudohalftone processing of an input signal from the edge emphasis circuit 5. A selector 7 selects whether or not halftone processing should be performed by an ASEL signal (autoselect signal). A binary coding circuit 8 converts multivalue data from the edge emphasis circuit 5 into binary data in order to transmit the converted data to a binary printer (for example, a laser-beam printer (LBP)). An output signal from the binary coding circuit 8 is input to the selector 7.

In the above-described configuration, the enlarged projection image of the microfilm is subjected to image scanning by a scanning optical system (not shown), and a serial image signal is taken out as an ananog value from the image sensor 1 using a line synchronizing signal. The serial image signal is amplified up to a proper value by the amplifier 2 as an input signal to the A/D converter 3. At the same time, offset voltage adjustment is performed. The signal input to the A/D converter 3 is converted into an 8-bit digital signal having values between 0–255, and is input to the $\gamma$ correction circuit 4.

Figure 5:
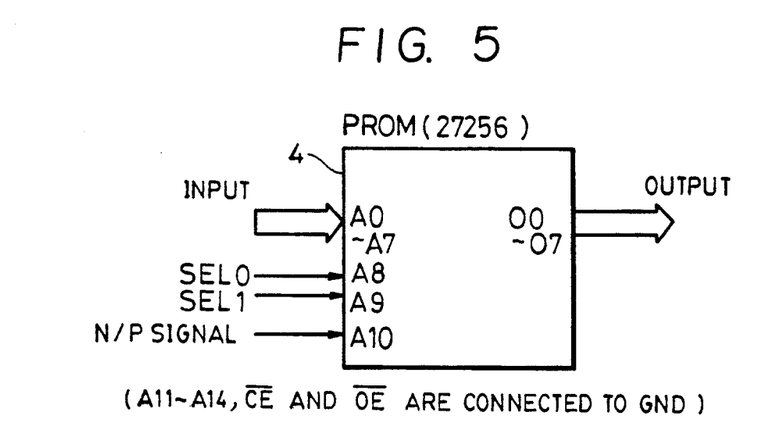
FIG. 5 is a block diagram showing a detailed example of the $\gamma$ correction circuit shown in FIG. 4.

The $\gamma$ correction circuit 4 can, for example, be constituted by one PROM (programmable read-only memory), as shown in FIG. 5. In FIG. 5, the 8-bit digital input signal from the A/D converter 3 is input to input ports A0–A7 as address bus, and an output signal is output from output ports 00–07 as data bus. Input ports A8 and A9 are used for select signals SEL0 and SEL1 for the $\gamma$ curve. Input port A10 is used for an N/P (negative/positive) signal for switching the $\gamma$ curve according to a negative film or a positive film.

Figure 6:
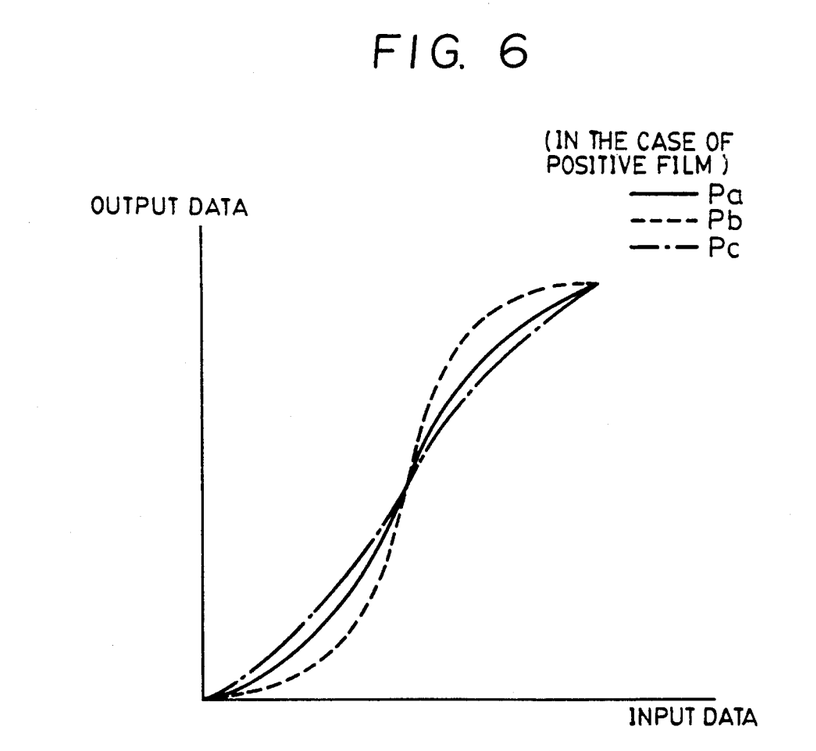
FIG. 6 is a characteristic diagram showing an example of the $\gamma$ curve between input data and output data in the case of a positive film in the $\gamma$ correction circuit shown in FIG. 5.
Figure 7:
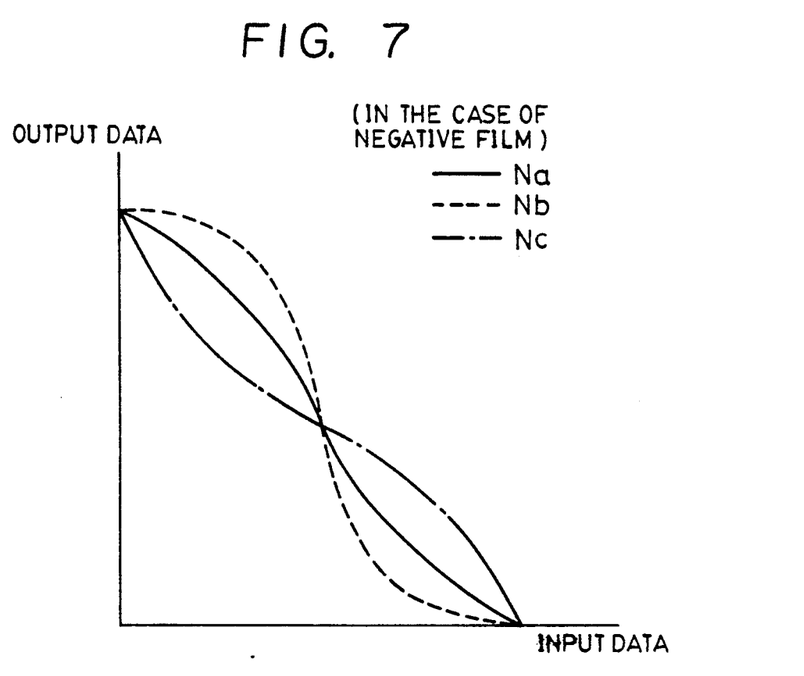
FIG. 7 is a characteristic diagram showing an example of the $\gamma$ curve between input data and output data in the case of a negative film in the $\gamma$ correction circuit shown in FIG. 5.

At this time, waveform data as shown in FIGS. 6 and 7 are stored in the PROM 4 shown in FIG. 5 according to experimental data which have previously been measured. FIG. 6 shows $\gamma$ curves in the case of positive films. One of the three kinds ($P_a$, $P_b$ and $P_c$) of curves is selected by the signals SEL0 and SEL1 in accordance with the density, contrast, gradation and the like of the film. FIG. 7 shows $\gamma$ curves in the case of negative films. In this case also, one of the three kinds ($N_a$, $N_b$ and $N_c$) of curves is selected by the signals SEL0 and SEL1 in accordance with the density, contrast, gradation and the like of the film. For example, the curve $N_a$ is used for a film having a proper density of D (film density)=0.8–1.2, the curve $N_b$ is used for a low-contrast film having D=0.6–0.8, and the curve $N_c$ is used for a high-contrast film having D=1.2 or more. The situation is identical in the case of positive films. That is, the curves $P_a$, $P_b$ and $P_c$ in FIG. 6 are used for positive films having a proper density, low constrast and high constrast, respectively.

Figure 8:
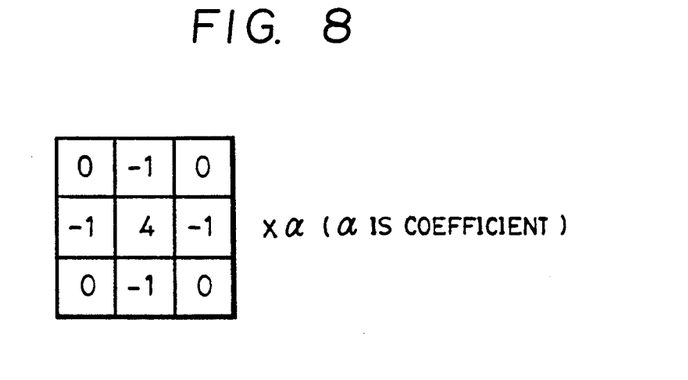
FIG. 8 is a diagram for explaining an example of a convolution mask and mask coefficient used in the edge emphasis circuit shown in FIG. 4.

The digital signal output from the $\gamma$ correction circuit 4 is input to the edge emphasis circuit 5, where the signal is subjected to digital filtering processing by a 3×3 Laplacian convolution mask as shown in FIG. 8. The step of edge emphasis at this time can be changed by coefficient $\alpha(0<\alpha<4)$ for the Laplacian convolution mask. The coefficient $\alpha$ is determined by SHARP data given from a CPU 13, which will be described later. The step of edge emphasis is thereby determined.

As described above, since dust, stain, scratch and the like generally have densities close to those of line-drawing portions in the case of a positive film, they become considerably emphasized if the step of edge emphasis is increased, and so a dirty image is obtained. To the contrary, in the case of a negative film, since dust and the like have densities close to those of background portions, they do not become emphasized even if the step of edge emphasis is increased.

Accordingly, the magnitude of the step of edge emphasis should be changed according to a negative film or a positive film. The value of the SHARP data in the present embodiment is arranged to be different according to a negative film or a positive film. Sharpness of a film differs according to the resolution of the lens and the degree of out of focus of a camera when an original for a film (an original before photographing) is photographed, or the kind of the film, the kind of a developer for the film, development conditions and the like. Furthermore, it is necessary to change the step of edge emphasis according to the kind of an original for a film and the user's applicational purpose. Accordingly, the step of edge emphasis can be changed by changing the value of the SHARP data according to the value of a sharpness-adjusting variable resistor 11 on a keyboard on the apparatus of the present embodiment as shown in FIG. 9.

Figure 9:
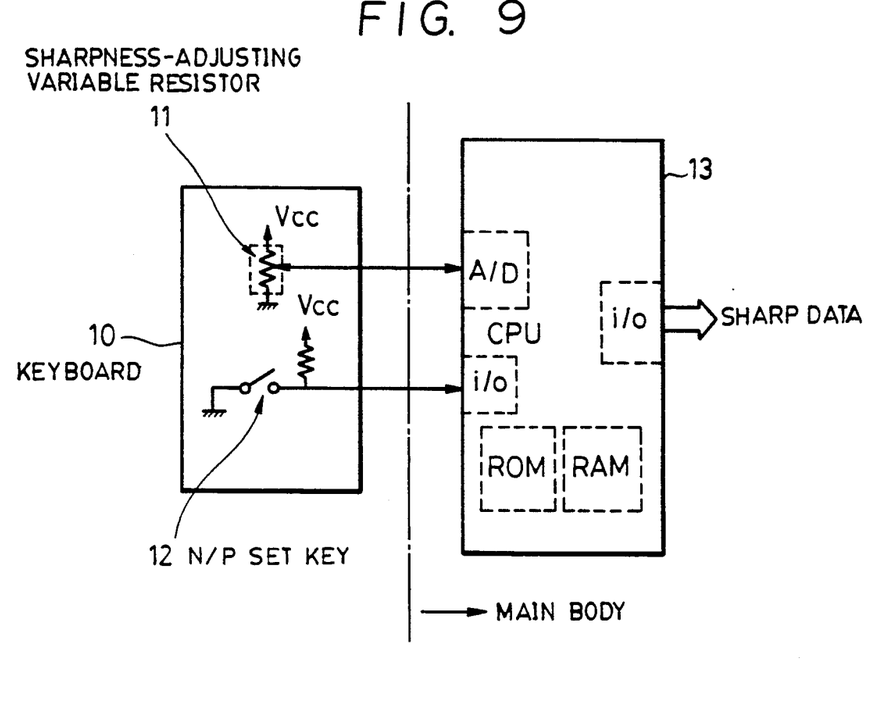
FIG. 9 is a block diagram showing an example of the configuration of a generation circuit for SHARP data supplied to the edge emphasis circuit shown in FIG. 4.

FIG. 9 shows an example of the schematic configuration of circuitry for calculating the SHARP data. In FIG. 9, a keyboard 10 on the reader printer of the present embodiment performs setting of various data and display. The sharpness-adjusting variable resistor 11 and an N/P set key 12 are provided within the keyboard 10. Signals from the variable resistor 11 and the key 12 are input to the one-chip CPU (central processing unit) 13 within the main body of the reader printer. As the one-chip CPU 13, a known microcomputer incorporating an A/D converter, input/output ports, a ROM (read-only memory), a RAM (random access memory) and the like can be used. An analog signal from the sharpness-adjusting variable resistor 11 is input to an A/D converter within the one-chip CPU 13, and is converted into data having a value between 0–255.

Figure 10:
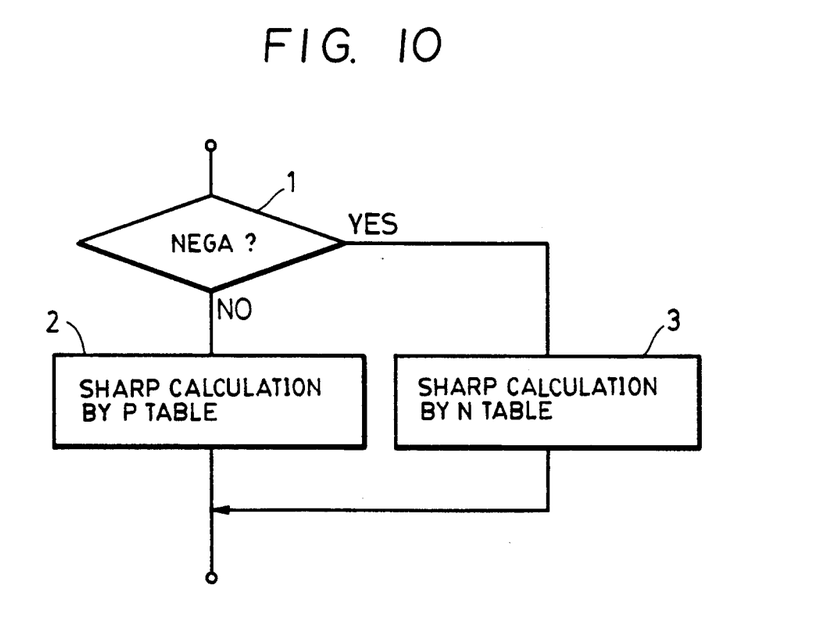
FIG. 10 is a flowchart showing an operation procedure for calculating the SHARP data by the CPU (central processing unit) shown in FIG. 9.

As shown in the flowchart of FIG. 10, the signal branches according to a negative or positive film at step (1) by a signal from the N/P set key 12 input to the one-chip CPU 13, that is, goes to step (3) in the case of a negative film, and goes to step (2) in the case of a positive film.

Figure 11:
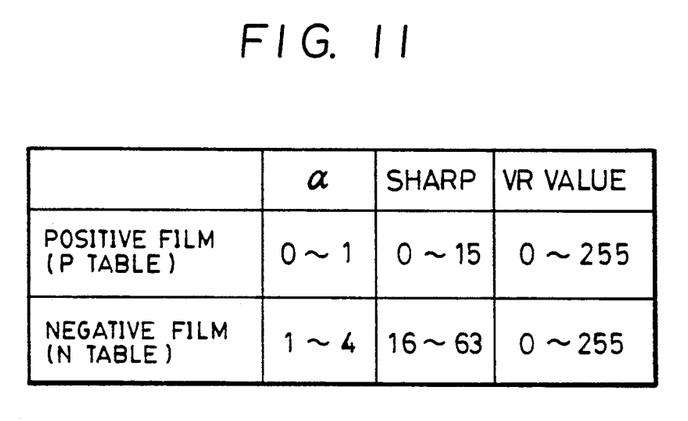
FIG. 11 is a diagram for explaining an example of the contents of tables used in the processing procedure shown in FIG. 10.
Figure 12:
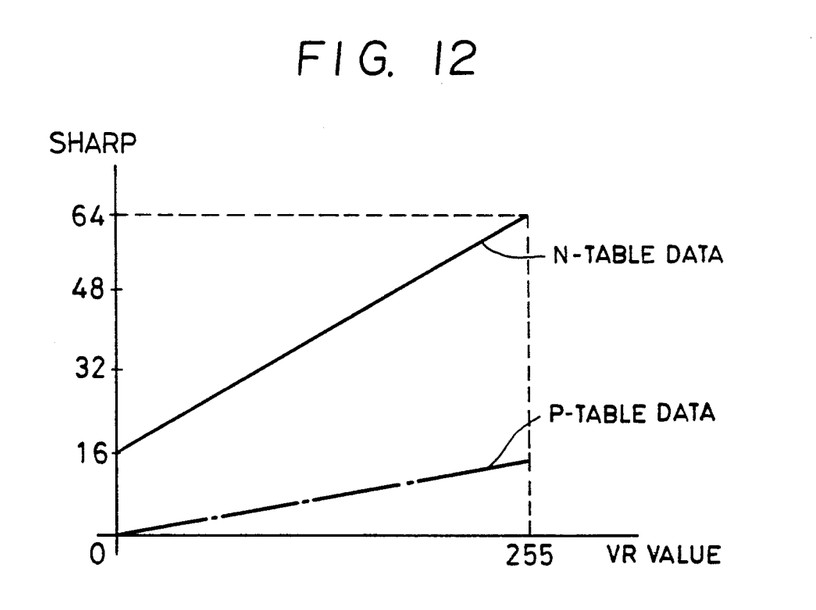
FIG. 12 is a graph showing in detail data in the tables shown in FIG. 11 by line drawings.

At steps (2) and (3), table data so that the relationships as shown in FIGS. 11 and 12 (the numerical values shown in FIGS. 11 and 12 represent an example) can be obtained have previously been stored in the ROM within the one-chip CPU 13, and P table and N table are searched at steps (2) and (3), respectively. Thus, the SHARP data corresponding to the digital value (VR value) of the sharpness-adjusting variable resistor 11 are obtained.

That is, as shown in FIG. 12, in the case of positive films, the SHARP data have values 0–15 in accordance with changes 0–255 in the VR value. In the case of negative films, the SHARP data have values 16–63 in accordance with changes 0–255 in the VR value.

The SHARP data are input to the edge emphasis circuit 5, which uses results obtained by dividing the SHARP data by the value "16" (that is, values 0–4) as values for the above-described coefficient $\alpha$.

Accordingly, the coefficient $\alpha$ becomes $0<\alpha<1$ in the case of positive films, and $1 \leq \alpha < 4$ in the case of negative films.

As described above, since the coefficient $\alpha$ for positive films is set to values smaller than those for negative films, the amount of edge emphasis for positive films becomes smaller than that for negative films. Hence, it is possible to prevent dust and stain on a positive film from being emphasized by edge emphasis processing to provide an unsightly image.

The signal subjected to edge emphasis by the edge emphasis circuit 5 is input to the halftone processing circuit 6, where binary coding using pseudo-halftone processing is performed. This processing uses, for example, an error diffusion method (ED method). As is well known, this is a method in which the density of a certain picture element is compared with a predetermined threshold value and a produced error (a difference value between the density of the picture element and the threshold value) is diffused to the densities of a plurality of adjacent picture elements. This method is one of representative pseudo-halftone processings.

The binary coding circuit 8 connected to an output terminal of the edge emphasis circuit 5 in parallel with the halftone processing circuit 6 compares the input 8-bit signal with REF data(reference data), and converts the signal into a binary value 1 or 0. The selector 7 selects whether the signal passing through the halftone processing circuit 6 or the signal passing through the binary coding circuit 8 is used. The selector 7 is switched by the signal ASEL corresponding to the operation on the keyboard 10 on the reader printer.

As is generally known, an image subjected to halftone processing has excellent gradation, and has a pronounced effect particularly in the case of a photographed picture or the like. For a line drawing as well as for a photographed picture, it becomes possible to provide differences in the density of a character and the like having density differences by halftone processing. However, since pseudo-halftone processing, in which a binary printer determines whether or not a dot is to be printed by a 1-bit input signal having a value 0 or 1 and the density of one dot itself in uniform, functions like a shading effect, sharpness is more or less decreased. Hence, in the case of a film image composed of only line drawings, pseudo-halftone processing should not be performed. For this purpose, the system is arranged so that whether halftone processing is performed or binary coding is performed without performing halftone processing can be selected by the selector 7 according to the signal ASEL. The system is also arranged so that the user can alternately instruct the selection processing using a function key (not shown) on the keyboard 10.

(3) Other Embodiments

Although, in the FIG. 4 embodiment of the present invention, a Laplacian space filtering using a 3×3 convolution mask is used for edge emphasis, the present invention is not limited thereto, but other methods, for example edge emphasis using nonsharpening masking, may also be adopted.

Furthermore, it is not obligatory to use a 3×3 pattern when edge emphasis is performed using a convolution mask, but, for example, a 5×5 mask may of course be used.

Figure 13:
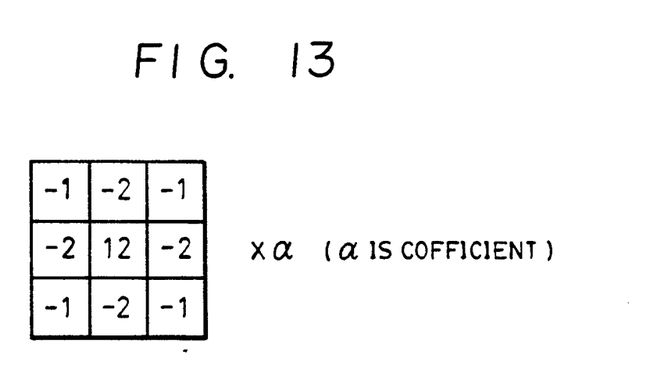
FIG. 13 is a diagram showing an example of another convolution mask corresponding to that shown in FIG. 8.

Moreover, the mask coefficients are not limited to those shown in FIG. 6, but, for example, a coefficient shown in FIG. 13 provides more natural looking edges from the viewpoint of increasing the step of edge emphasis in an oblique direction.

Although, in the foregoing embodiment, the γ correction circuit 4 is configured by an EPROM, a rewritable PROM, such as an E²PROM or the like, may also be used, or data may be loaded from another PROM by a CPU or the like using an SRAM (a static RAM) or the like. It is effective to use an SRAM or the like for the γ correction circuit 4 since a high-speed memory is needed particularly for a high-speed reading system.

The γ correction data may not particularly have predetermined characteristic curves, but may be used together with logarithmic transformation, offset adjustment and the like.

Furthermore, generation of the N/P signal given to the γ correction circuit 4 in the foregoing embodiment can be performed by either selection of the set key by the user or automatic N/P discrimination by a film detection sensor (not shown), and the generation method is not limited.

Figure 14:
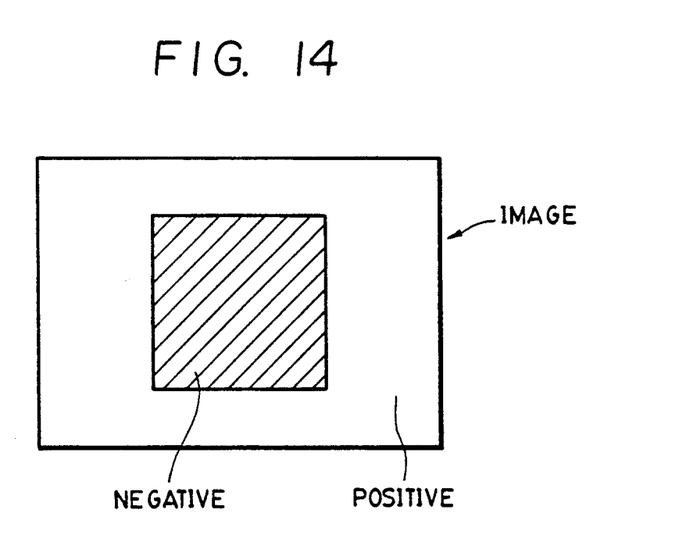
FIG. 14 is a diagram showing the contents of processing in another embodiment of the present invention.

Even in the case of an image in which a negative image and a positive image are partially mixed as shown in FIG. 14, it becomes possible to deal with the image by performing real-time processing of the N/P signal relative to the image signal and changing the curve for γ correction and the degree of edge emphasis in accordance with the processing.

Although, in the foregoing embodiment, a contact-type image sensor is used as the image sensor, a noncontact-type CCD or the like may also be used, and an area sensor may be used in place of a line sensor.

Although halftone processing is not particularly needed for the configuration of the foregoing embodiment, it is preferred to use halftone processing when a binary printer is used. That is, since unevenness exists on dense portions on a film due to graininess and the like in the case of a microfilm, and the unevenness is emphasized by performing edge emphasis, black portions which should originally have had a constant density are represented by violent changes in amplitude. As a result, even if binary coding is performed by constant-slice data, a so-called pseudo-halftone-like image is obtained as if halftone representation is performed. Hence, it is not necessary to again perform pseudo-halftone processing. However, since a reproduction characteristic for gradation is not so good, pseudo-halftone processing should be added for a photographed picture and the like where better reproduction characteristic for gradation is needed.

The present invention is not limited to monochromatic (black and white) images, but can be applied to a reading device for color images. In this case, however, it is necessary to provide circuitry as shown in FIG. 2 for every color of R (red), G (green) and B (blue), or to utilize an identical circuitry for every color by performing a time sharing operation.

In the foregoing embodiment, a binary printer is used as the printer, which is not limited to a specific printer, such as a laser-beam printer (LBP), a thermal transfer printer, an ink-jet-type printer or the like. In the case of a low-speed printer, however, it is necessary in some cases to connect the printer to the image reading device via a memory and an interface. The present invention can also be applied when a multivalue printer is used. It is also possible to reproduce a read image not by a printer, but on a display, such as a CRT, liquid crystal or the like.

Figure 15:
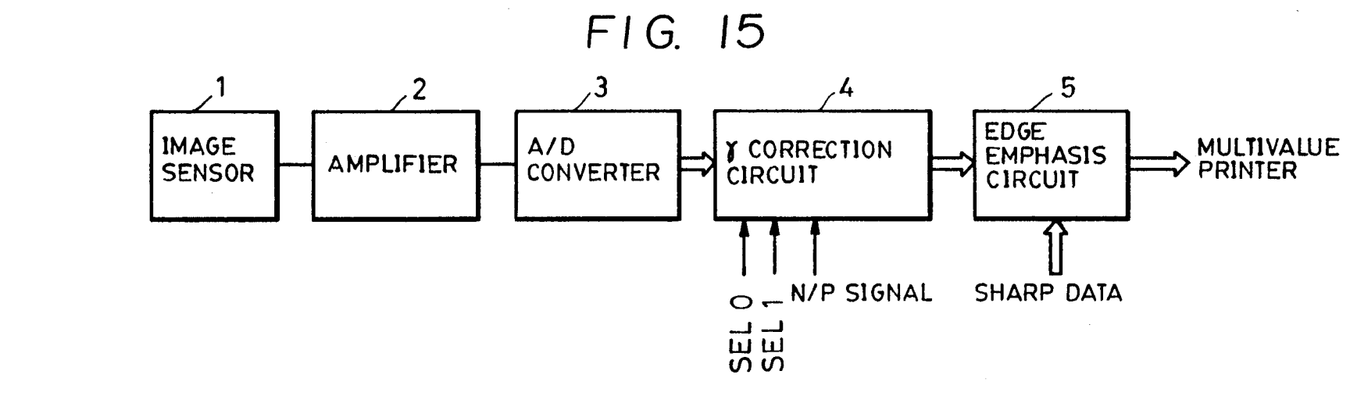
FIG. 15 is a block diagram showing the circuit configuration of still another embodiment of the present invention.

FIG. 15 shows the configuration of another embodiment of the present invention when a multivalue printer (a printer in which the density for one dot is determined by an input signal having multi-bit data) is used as the printer. There is no particular halftone processing circuit in the present embodiment, since multivalue data themselves can represent haftone in the case of a multivalue printer, and so gradation having excellent reproducibility can be obtained even from output data without modification from the γ correction circuit 4. As in the first embodiment, the user can change sharpness by the edge emphasis circuit 5.

Although, in the first embodiment, the range within which the edge-emphasis step can be changed is switched according to the kind of a negative or positive film, it is of course possible to provide, for example, two kinds of edge-emphasis steps, and to switch between the edge-emphasis steps according to the kind of a negative or positive film. In a more simplified manner, it is also possible to arrange so that edge emphasis is performed only in the case of a negative film, and edge emphasis is not performed in the case of a positive film.

As explained above, in an image reading device for films used in a digital-type reader printer or the like, edge emphasis processing is performed by selecting an optimum edge-emphasis step in accordance with a negative film or a positive film. Hence, the present invention has the effects that it is possible to easily obtain an output image having excellent image sharpness and in which dust, stain, scratches and the like on a film are not emphasized from either a negative film or a positive film.

Furthermore, since the system is arranged so that an optimum data correction characteristic ($\gamma$ curve) is selected in accordance with the kind of a negative film or a positive film, an output image having excellent gradation can easily be obtained from either a negative film or a positive film.

Moreover, the present invention has the advantage that, by previously reversing the $\gamma$ curve itself, it is not necessary to reverse an image signal according to a negative film or a positive film.

Each of the elements shown in block outline in FIG. 1, as well as in FIGS. 2-5, 9 and 15, is well known per se and its specific type or construction is not critical to carrying out the invention or th a disclosure of the best mode for carrying out the invention.

While the present invention has been explained by reference to the preferred embodiments, the present invention is not limited to the configurations of the preferred embodiments, but various changes and modifications can of course be made within the scope of the following claims.

What is claimed is:

1. An image reading device comprising:
   reading means for reading a film image to output an image signal;
   processing means for performing a process for edge emphasis of the image signal output from said reading means;
   setting means for setting a coefficient for edge emphasis performed by said processing means;
   indication means for indicating whether the film image is a negative image or a positive image; and
   control means for controlling the coefficient set by said setting means in accordance with the indication by said indication means.

2. An image reading device according to claim 1, wherein said control means adjusts an amount of edge emphasis by said processing means.

3. An image reading device according to claim 1, wherein said processing means performs edge emphasis by digital filtering processing.

4. An image reading device according to claim 1, wherein said reading means reads an image of a microfilm.

5. An image reading device according to claim 1, wherein said control means makes the value of the coefficient used by edge emphasis in the positive image smaller than the value of the coefficient used by edge emphasis in the negative image.

6. An image reading device comprising:
   reading means for reading a film image to output an image signal line by line;
   processing means for performing a process for density conversion of the image signal output from said reading means;
   indication means for indicating whether the film image is a negative image or a positive image; and
   control means for making the density conversion process by said processing means different for a negative image and a positive image according to the indication by said indication means, wherein said control means controls a conversion characteristic for the density conversion performed by said processing means, with said processing means performing density conversion based on the same conversion characteristic for a plurality of pixels in the same line.

7. An image reading device according to claim 6, wherein said processing means performs density conversion in accordance with a density conversion curve.

8. An image reading device according to claim 7, wherein said control means selects the density conversion curve which said processing means uses for the density conversion in accordance with the indication by said indication means.

9. An image reading device according to claim 6, wherein said reading means reads an image of a microfilm.

* * * * *

UNITED STATES PATENT AND TRADEMARK OFFICE
CERTIFICATE OF CORRECTION

PATENT NO. : 5,231,515
DATED : July 27, 1993
INVENTOR(S) : Endo

It is certified that error appears in the above-indentified patent and that said Letters Patent is hereby corrected as shown below:

TITLE PAGE

[56] REFERENCES CITED:

U.S. PATENT DOCUMENTS, Insert the following;
```
--4,789,878  12/66  Endo, et al.
  4,700,237  10/87  Yoshioka, et al.
  4,341,463  07/82  Kashiwagi, et al.
  4,627,703  12/86  Suzuki, et al.--.
```

COLUMN 7:

Line 30, "in" should read --is--.

Signed and Sealed this

Tenth Day of May, 1994

Attest:

BRUCE LEHMAN

*Attesting Officer*  *Commissioner of Patents and Trademarks*